United States Patent [19]

Willis

[11] Patent Number: 4,792,266

[45] Date of Patent: Dec. 20, 1988

[54] ROTARY FINISHING TOOL

[76] Inventor: Lawrence E. Willis, 5428 Odell, St. Louis, Mo. 63139

[21] Appl. No.: 31,940

[22] Filed: Mar. 27, 1987

[51] Int. Cl.⁴ .............................................. B23C 1/20
[52] U.S. Cl. ..................................................... 409/182
[58] Field of Search ................................ 409/181, 182

[56] References Cited

U.S. PATENT DOCUMENTS

| | | | |
|---|---|---|---|
| 2,452,818 | 11/1948 | Williams | 90/12 |
| 2,599,415 | 6/1952 | Russell | 90/12 |
| 2,732,671 | 1/1956 | McFadden | 51/170 |
| 3,241,453 | 3/1966 | Baldwin | 90/12 |
| 3,721,157 | 3/1973 | Bacher | 90/18 |
| 3,811,361 | 5/1974 | Seely et al. | 409/182 |
| 3,893,372 | 7/1975 | Strakeljahn | 90/12 D |
| 3,955,607 | 5/1976 | Roche | 144/134 D |
| 3,981,226 | 9/1976 | White | 90/12 D |
| 4,044,805 | 8/1977 | Gronholz | 409/182 |
| 4,156,990 | 6/1979 | Rutkowski | 51/170 PT |
| 4,279,554 | 7/1981 | Seidenfaden | 409/180 |
| 4,504,178 | 3/1985 | Seidenfaden | 409/138 |
| 4,640,324 | 2/1987 | Lounds | 409/182 |
| 4,674,548 | 6/1987 | Mills et al. | 409/182 |
| 4,696,331 | 9/1987 | Irland | 409/182 |

FOREIGN PATENT DOCUMENTS 2406498 5/1979 France ................... 409/182

Primary Examiner—J. Patrick McQuade

[57] ABSTRACT

A rotary finishing tool for finishing a laminated workpiece by removing rough, burred or sharp edges from the workpiece. The hand operated tool includes an air motor that moves in a telescopic fashion within a base member to provide for axial adjustment of a finishing bit in order to finish the edges of a laminated workpiece. The base member carries a guide member for properly locating the finishing bit with respect to an unfinished edge of the workpiece. The shape of the finishing bit allows axial, telescopic adjustment of the finishing bit. The finishing bit radius cutting edge is the only part of the finishing bit to contact the workpiece due in part to the close tolerances maintained when machining the finishing bit and manufacturing and assemblying the rotary finishing tool.

13 Claims, 2 Drawing Sheets

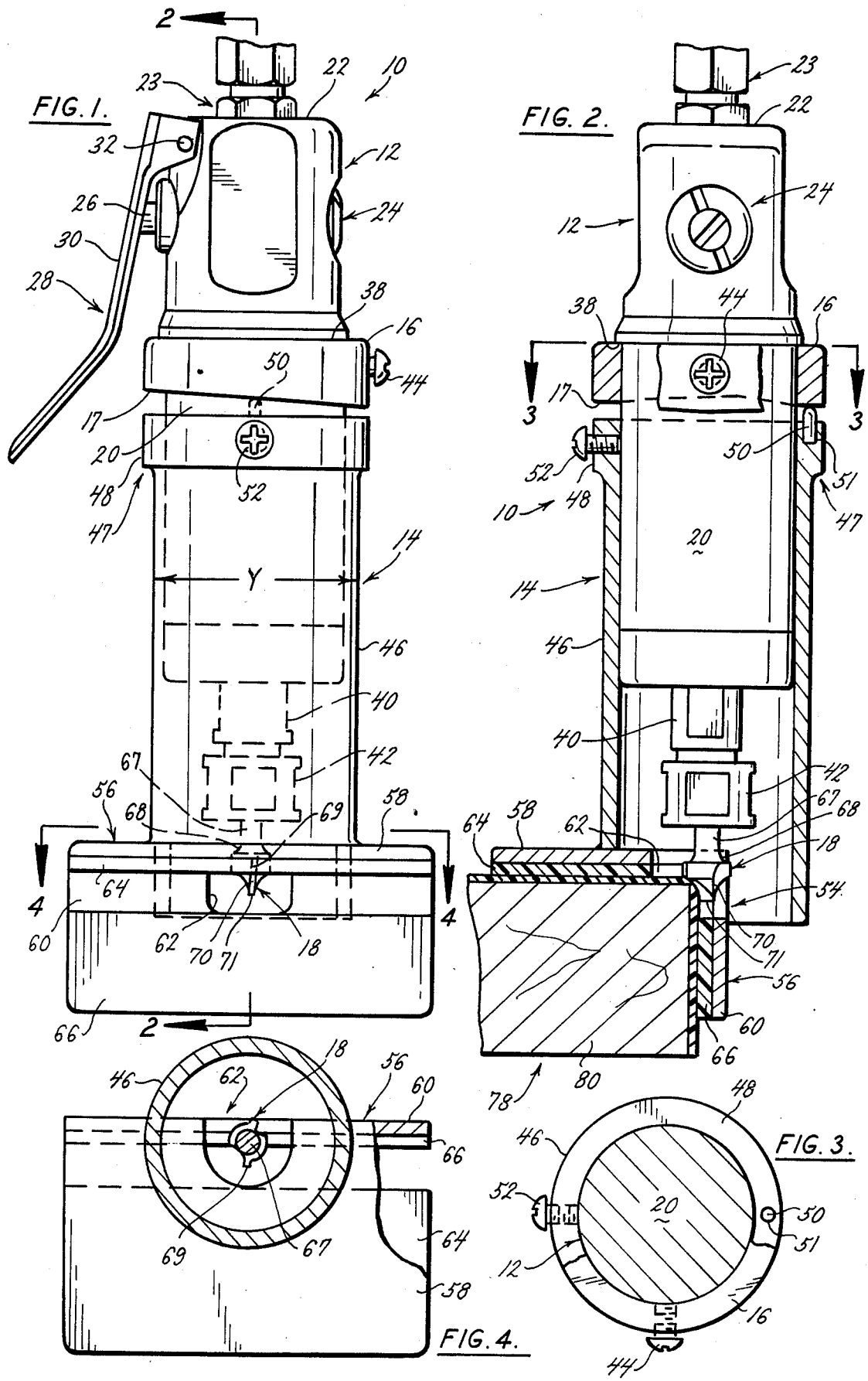

ROTARY FINISHING TOOL

BACKGROUND OF THE INVENTION

This invention relates generally to a rotary finishing tool, and more particularly, to a rotary finishing tool for removing rough, burred or sharp edges from a workpiece. The workpiece generally includes a core material and a plurality of laminate members affixed to at least two surfaces of the core material.

Conventionally extra laminate material is removed from an edge of the laminated workpiece prior to hand finishing. Hand filing is generally required to finish the edge so as to remove burrs, knicks and any sharp edges on the workpiece. Hand filing a workpiece to a finished edge is labor intensive and expensive but necessary in order to finish the workpiece to the specifications generally demanded and expected, particularly for custom work. Furthermore, hand filing is something of an art and an unskilled worker can easily ruin an expensive workpiece during the final stages of preparation.

Prior tools have provided for preparing mitered joints, U.S. Pat. No. 3,955,607; beveled edges, U.S. Pat. Nos. 3,893,372 and 3,241,453; or tools using a ball or spherical cutter, U.S. Pats. No. 4,504,178 and 4,279,554. Prior tools have also provided cutting tool gauges, U.S. Pat. No. 4,156,990; and trimming laminate plastic sheets, U.S. Pat. Nos. 3,981,226; 3,721,157; and 4,044,805.

The rotary finishing tool of the present invention solves these and other problems in a manner not disclosed in the known prior art.

SUMMARY OF THE INVENTION

In the present invention power means are provided for operating the rotary finishing tool. The rotary finishing tool includes a housing for the power means. A finishing bit is operatively associated with the power means. The finishing bit generally includes at least one radius cutting surface for finishing an edge of a workpiece. Guide means are provided for guiding the rotary finishing tool along the edge of the workpiece. The guide means includes a base member and a guide member. The base member is operatively associated with the power means housing for telescoping axial movement. The guide member defines a plane substantially perpendicular to the rotational axis of the finishing bit. The guide member further defines a plane substantially parallel to the rotational axis of the finishing bit. The guide member provides proper orientation between the rotary finishing tool and the workpiece such that the finishing bit removes substantially all sharp, burred or rough edges from the edge of the workpiece. Adjustment means are provided for axially adjusting the finishing bit relative to the guide member and the workpiece. The adjustment means takes advantage of the telescoping relationship between the power means housing and gude means.

It is an aspect of the present invention that a rotary finishing tool is provided that alleviates the need for hand filing to finish a laminated workpiece.

It is another aspect of the present invention that a rotary finishing tool is provided with an adjustment means providing for ease of adjustment in order that the tool can be used on different laminates having different thicknesses.

It is another aspect of the present invention that a rotary finishing tool is provided that is easy to use and, because it is easy to use, can reduce the amount of labor required to accomplish the labor intensive task of finishing the workpiece edge.

It is another aspect of the present invention that a rotary finishing tool is provided that includes a nonspherical finishing bit.

It is another aspect of the present invention that a rotary finishing tool is provided that includes a removable finishing bit. The finishing bit can be removed when dulled and replaced with a new finishing bit or the finishing bit can be sharpened and replaced.

It is another aspect of the present invention that a rotary finishing tool is provided with a finishing bit including at least one radius cutting surface. Furthermore, only the cutting edge of the finishing bit contacts the workpiece.

It is another aspect of the present invention that a rotary finishing tool is provided in which the power means is an air motor.

It is another aspect of the present invention that a rotary finishing tool is provided with a guide means including a guide member for guiding the rotary finishing tool along the edge of the workpiece. The guide member may include low friction shims providing minimum friction between the guide member and the workpiece.

BRIEF DESCRIPTION OF THE DRAWINGS

Further features and characteristics of the present invention can be seen from the figures and descriptions below in which:

FIG. 1 is an elevation of an embodiment of the present invention,

FIG. 2 is a sectional view taken along line 2—2 in FIG. 1,

FIG. 3 is a sectional view taken along line 3—3 in FIG. 2,

FIG. 4 is a sectional view taken along line 4—4 in FIG. 1, and

DESCRIPTION OF THE PREFERRED EMBODIMENT

Figure 5:
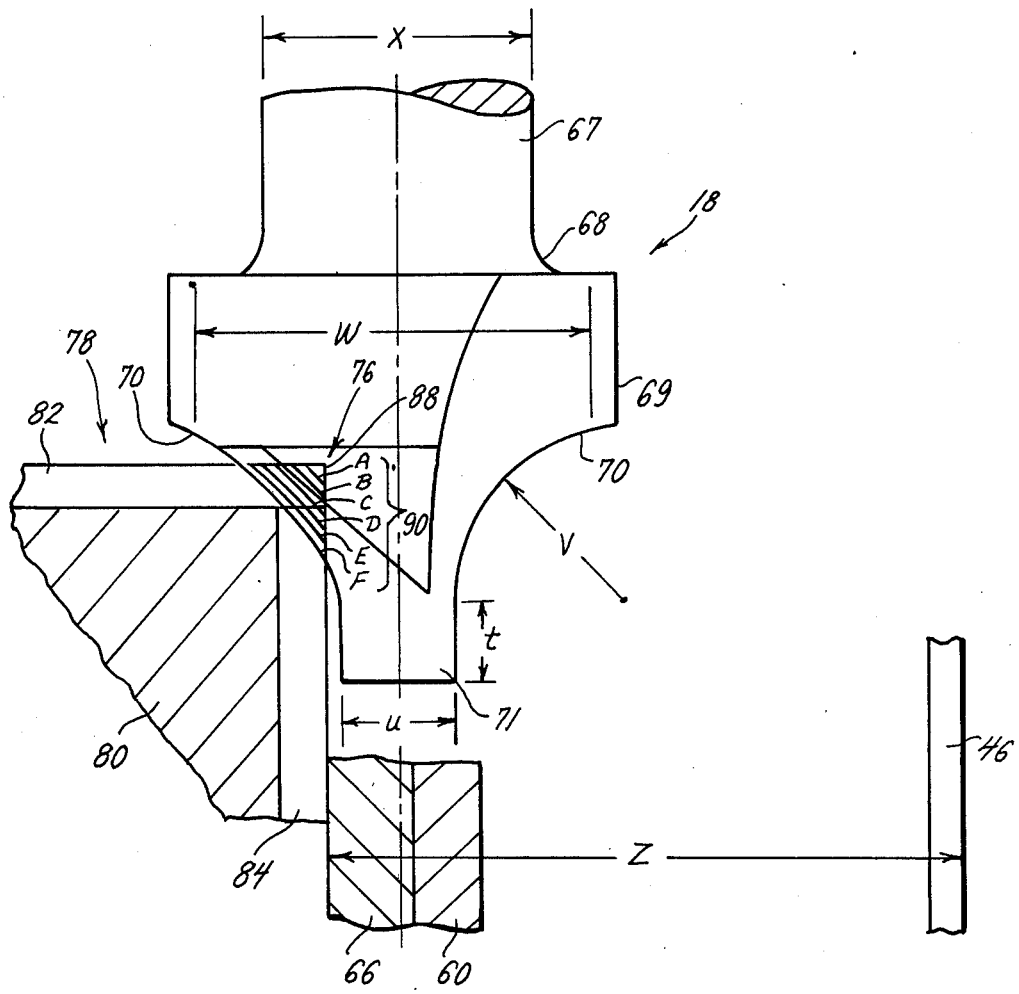
FIG. 5 is a detailed elevation of a finishing bit and workpiece.

Referring now by characters of reference to the drawings and first to FIG. 1 it will be understood that a rotary finishing tool or tool generally indicated by reference character 10 includes a power means 12, a guide means 14, and an axial adjustment means. In the preferred embodiment the power means 12 includes a pneumatic motor also referred to as an air motor. The adjustment means generally includes a cam means and further includes a cam ring 16 and a cam surface 17. The tool 10 uses a finishing bit 18 driven by the air motor 12. The finishing bit is preferably a carbide bit. The tool 10 further includes a power means housing 20, for example, a generally cylindrical body that serves as an air motor housing. The air motor housing 20 is associated with a base member 46 in a telescoping axial relationship.

The air motor 12 includes a compressed air inlet 22 for the compressed air necessary to operate the tool 10. An adjustment screw 24 provides for pressure regulation of the compressed air supplied to operate the tool 10. A typical compressed air fitting 23 illustrates one possible connection between the tool 10 and a compressed air line from a compressed air source.

Typically, the air motor 12 operates in response to depression of a push button 26. A lever assembly 28 includes a lever arm 30 that pivots on a hinge 32. One hand operation of the lever assembly is normally sufficient to control compressed air to the air motor 12 and operate the tool 10.

The air motor housing 20 includes a shoulder means 38. The cam means forming a part of the axial adjustment means is operatively associated with the shoulder means 38. The cam ring 16 is free to rotate about the air motor housing 20 when not fixed in place by a retaining means. In the preferred embodiment a cam ring set screw 44 is the retaining means.

A finishing bit chuck 42 attached to an output shaft 40 of the air motor 12 releasably operatively carries the finishing bit 18 for rotation about its axis by the air motor 12. The base member 46 associated with the guide means 14 generally conceals the lower portion of the air motor 12 including the output shaft 40 and chuck 42. The base member 46 will preferably be a generally cylindrical base member. The air motor housing 20 fits within the cylindrical base member 46 and can move at least axially within base member 46 in a generally telescoping fashion.

An upper end portion 47 of the base member 46 includes additional structure forming part of the adjustment means. The additional structure is a base member flange 48 formed on the upper end portion 47. The base member flange 48 carries a projection or pin 50 in a pin aperture 51 and another retaining means or base member set screw 52. The base member set screw 52 acts as a set screw to fix the cylindrical base member 46 relative to the air motor housing 20.

The base member 14 includes a notch 54. The notch receives a guide member 56 as generally shown in FIG. 2.

The finishing bit 18 extends at least partially through a guide member aperture 62 defined by the guide member 56.

The guide member includes one guide member portion, a horizontal guide member 58 and another guide member portion, a vertical guide member 60. The horizontal guide member 58 defines a plane generally perpendicular to the rotational axis of the finishing bit. The vertical guide member 60 defines a plane generally parallel to the rotational axis of the finishing bit.

In a preferred embodiment the horizontal guide member 58 includes a shim 64 and the vertical guide member 60 includes another shim 66. The shims 64, 66 are preferrably plastic to allow the guide member arrangement to slide easily over a workpiece 78.

The finishing bit 18 includes a shank member 67 that is received by the chuck 42. The finishing bit further includes a body 68 and at least one cutting flute 69 with a radius cutting edge 70. The finishing bit 18 tapers off to a generally blunt end 71.

As an illustration of one preferred embodiment of the rotary finishing tool the operation of the tool will now be described. Reference is made to FIGS. 2, 4 and 5. The tool 10 is generally intended for removing rough, burred or sharp edges from an edge 76 of the workpiece 78. The workpiece 78 generally includes a core material 80 an upper laminate member 82 and at least one side laminate member 84.

It should be noted that the end 71 of the finishing bit 18 does not contact the workpiece during the finishing process. Only the cutting edge 70 contacts the workpiece 78.

Assembly of the workpiece 78 will be only briefly described. Typically the workpiece, for example a laminated counter top, is assembled by applying the side laminate member to an edge of the core material 80. The top edge of the side member is trimmed flush with the top surface of the core material 80. The edge left by the trimming step is rough, burred and often includes sharp sections. The upper laminate member 82 is applied to the top surface of the core material 80 and the edge of the upper laminate member 82 is trimmed flush with the side laminate member 84. This trimmed edge is often rough and burred with sharp sections. The workpiece edge 76 must be finished before the workpiece 78 can be considered complete. Typically, the rough edge is hand filed, a long and labor intensive task. The present invention reduces the time required, labor involved and provides a better, more uniform finished edge.

Further reference is now made to FIG. 5 illustrating the finishing bit 18 and comparing an unfinished contour 88 and a plurality of finished contours 90 on the workpiece edge 76. The plurality of finished contours are further identified on FIG. 5 with letters "A" through "F". It will be understood that the finishing bit 18 is infinitely adjustable and that only six contours have been illustrated for convenience and clarity.

The finishing bit 18 can be adjusted vertically along its rotational axis with respect to the workpiece 78. Vertical adjustment of the finishing bit 18 can be accomplished with the adjustment means as will now be described.

For the purpose of the description it will be presumed that the finishing bit 18 is in a position (not shown) that would provide finished contour "C" and it is desired to position the finishing bit 18 to provide one of the other finished contours "A", "B" or "D" through "F". It will be necessary to move air motor housing 20 telescopically with respect to the base member 46.

The first step requires loosening either the cam ring set screw 44, this is the set screw bearing against the air motor housing 20, or the base member set screw 52, this is the set screw bearing against a portion of the air motor housing 20 telescopically received within the base member 46. It is thought to be easier to loosen both set screws 44, 52 so that adjustment of the air motor housing 20 and the air motor 12 within the base member 46 can be accomplished using only telescoping movement. The extent of telescopic engagement between the air motor housing 20 and the base member 46 depends upon the portion of the cam surface 17 in contact with the pin 50.

Therefore, vertical adjustment of the finishing bit 18 is accomplished by changing the relationship between the cam surface 17 and the pin 50. This is accomplished by rotating the cam ring 16 about air motor housing 20.

Presuming that both set screws 44, 52 are loosened for purposes of illustration, rotation of the cam ring 16 to the left, with respect to the drawing FIG. 1, will telescope the air motor housing 20 out of the base member 46 as the cam surface 17 rides on the pin 50 forcing the cam ring 16 upward. The cam ring 16 pushes against the cam ring shoulder 38 thereby telescoping the air motor housing 20 out of the base member 46. In this manner the finishing bit 18 is raised to provide a shallower finished contour, for example, contour "A" or "B". This position of the finishing bit 18 may be more suitable for finishing a workpiece having relatively thinner laminate members.

Rotating the cam ring 16 to the right opens a gap between the cam surface 17 and the pin 50. The cam ring is rotated the desired amount and the air motor 12 is telescoped further into the cylindrical base member 46 until the pin 50 again contacts the cam surface 17. In this manner, the finishing bit 18 is lowered to povide a deeper finished contour, for example, contour "D", "E" "E" or "F". This position of the finishing bit 18 (the finishing bit is actually shown at contour "F" in FIG. 5) may be more suitable for finishing a workpiece having relatively thicker laminate members.

Once finishing bit 18 has been adjusted it is just a matter of placing tool 10 on the workpiece 78 as illustrated, for example, in FIG. 2, depressing the handle 30 against push button 26, and sliding the tool 10 along the edge 76 of the workpiece 78, to obtain the desired finished contour 90. The tool 10 operates properly when it is held against the workpiece 78 in a generally upright position. Tilting the tool 10 will separate the finishing bit 18 from the workpiece 78. When tilted the tool 10 pivots on either or both the horizontal guide member 58 or the vertical guide member 60, such that the finishing bit 18 is pulled or drawn away from the workpiece 78. Therefore, it is practically impossible to use the tool 10 improperly and gouge or dig into the workpiece 78 with the finishing bit 18.

In the preferred embodiment the dimensional relationship between the finishing bit 18 and the guide member 56 is critical. This is due in part to the lack of contact between the finishing bit 18 and the workpiece 78 except at the cutting edge 70. No end or bearing guide is required for the finishing bit 18 even though the finishing bit is not a spherical finishing bit.

In a preferred embodiment the following dimensions have been established. There is a dimension of 0.125" ("t")from the finishing bit end 71 to the start of the radius of the cutting edge 70. The thickness of the finishing bit end 71 is 0.125"+/−0.001" ("u") and the radius of the cutting edge 70 is 0.156" ("v"). The finishing bit body 68 has a diameter of 0.375" ("w") and the finishing bit 18 has a 0.250" ("x") diameter shank 67. The outside diameter of the cylindrical base member is 1.750" ("y") and the dimension from the outside edge of the cylindrical base member to the vertical surface of the shim 66 is 0.951"+/−0" ("z").

From the foregoing description these skilled in the art will appreciate that all of the aspects of the present invention are realized. The use of a pneumatic motor or air motor as a power means has eliminated the need for hand filing to finish a laminated workpiece. Eliminating hand filing reduces the amount of labor required in an otherwise very labor intensive task. The rotary finishing tool includes an adjustment means that utilizes a cam means for providing axial adjustment of the finishing bit to provide a rotary finishing tool that can be used on different thickness laminates. The adjustment means allows the rotary finishing tool to be used to finish either standard thickness laminate or non-standard or custom laminates. The rotary finishing tool provides a guide means having a guide member including shims made of a low friction material such as plastic that reduce friction between the guide member and the workpiece thereby reducing the effort required to operate the rotary finishing tool. The finishing bit is removable. A non-spherical finshing bit is used yet only the radius cutting edge contacts the workpiece.

One preferred embodiment of the rotary finishing tool 10 has been shown and described, however, it will be understood that many variations are possible. For example, the adjustment means might use a fastener arrangement other than set screws while still using the described cam ring and pin arrangement. The cross-sections of the base member and telescoping portion of the air motor housing do not have to be cylindrical. An electric or hydraulic motor may be used for the power means.

It will be further understood that the preferred embodiment of the rotary finishing tool has been described and illustrated herein and that the invention is not restricted to the illustrated adjusting means or air motor.

Other modifications may be made to the embodiment illustrated and described without departing from the spirit of the invention. It is not intended that the scope of this invention be limited to a particular embodiment. Rather, the scope of the invention is to be determined by the following claims and their equivalents.

What is claimed is:

1. A rotary finishing tool, comprising:
 (a) power means for providing power for operating the rotary finishing tool,
 (b) a housing for the power means,
 (c) a finishing bit operatively connected to the power means, the finishing bit having at least one radius cutting surface,
 (d) guide means for guiding the rotary finishing tool along an edge of a workpiece, the guide means including:
  (1) a base member, the base member operatively associated with the power means housing for telescoping axial movement between the base member and the power means housing,
  (2) a guide member associated with the base member, the guide member including a guide member portion, the guide member portion defining a plane substantially perpendicular to the rotational axis of the finishing bit, and another guide member portion, the other guide member portion defining another plane substantially parallel to the rotational axis of the finishing bit, the guide member portions, providing proper orientation between the rotary finishing tool and the workpiece, whereby both the one guide member portion and the other guide member portion are arranged for sliding contact with the workpiece, and
 (e) axial adjustment means for providing axial adjustment of the finishing bit, the axial adjustment means including cam means for providing axial adjustment of the finishing bit as the base member telescopes axially with respect to the power means housing,
 (f) the cam means providing a cam surface, the cam means rotatively associated with the power means housing,
 (g) the power means housing including shoulder means operatively associated with the cam means,
 (h) a retaining means for retaining the cam means in a desired position,
 (i) another retaining means for retaining the guide means in a desired axial relationship with the power means housing,
 (j) a projection from the guide means projecting towards the cam surface and in operative contact with the cam surface such that rotation of the cam means and thus the cam surface to thereby vary the cam surface portion in operative contact with the projection provides for relative axial, telescopic adjustment between the guide means and power means housing thereby adjusting the operative relationship between the finishing bit and the guide members.

2. The rotary finishing tool according to claim 1, wherein:
   (k) the finishing bit includes a shank member operatively associated with an output shaft, the output shaft operatively connected to the power means for rotating finishing bit.

3. The rotary finishing tool according to claim 1, wherein:
   (k) the finishing bit includes at least one cutting flute having at least one radius cutting edge.

4. The rotary finishing tool according to claim 1, wherein:
   (k) the finishing bit is non-spherical.

5. The rotary finishing tool according to claim 1, wherein:
   (k) the finishing bit is removable.

6. The rotary finishing tool according to claim 1, wherein:
   (k) the power means includes an air motor.

7. The rotary finishing tool according to claim 1, wherein:
   (k) the power means housing has a generally cylindrical body,
   (l) the guide means includes a generally cylindrical base member, the base member receiving the generally clyindrical housing body for telescopic, axial movement as determined by the axial adjustment means, thereby providing for axial movement of the radius cutting surface of the finishing bit with respect to the guide means and the edge of the workpiece to be finished.

8. The rotary finishing tool according to claim 1, further comprising:
   (k) a power means output shaft operatively associated with the power means,
   (l) a chuck associated with the output shaft for removably retaining the finishing bit.

9. The rotary finishing tool according to claim 1, wherein:
   (k) the guide means includes a generally cylindrical base member.

10. The rotary finishing tool according to claim 1, wherein:
    (k) the guide means includes an horizontal guide member defining the plane substantially perpendicular to the rotational axis of the finishing bit, and a vertical guide member defining the other plane substantially parallel to the rotational axis of the finishing bit depending from the horizontal guide member at substantially a right angle.

11. The rotary finishing tool according to claim 10, further comprising:
    (l) a notch in the base member for receiving the guide member.

12. The rotary finishing tool according to claim 10, further comprising:
    (g) a plurality of shims operatively associated with the horizontal guide member and the vertical guide member for providing low friction sliding contact between the guide member, and the workpiece.

13. The rotary finishing tool according to claim 10, wherein:
    (l) the guide means defines an aperture for receiving the finishing bit.

* * * * *